MULTIPLE LINGUAL TELEVISION IN A MULTIPLEX BROADCAST SYSTEM

Filed Aug. 15, 1962 2 Sheets-Sheet 1

INVENTORS
Eugene S. Feldman
Omar Wing

BY
Fisher, Christen, Sabol & Caldwell
ATTORNEYS

INVENTORS
Eugene S. Feldman
& Omar Wing

BY
Fisher, Christen, Sabol & Caldwell
ATTORNEYS

United States Patent Office 3,221,098

Patented Nov. 30, 1965

3,221,098
MULTIPLE LINGUAL TELEVISION IN A MULTIPLEX BROADCAST SYSTEM

Eugene S. Feldman, 310 W. 97th St., New York 25, N.Y., and Omar Wing, 501 W. 121st St., New York 27, N.Y.

Filed Aug. 15, 1962, Ser. No. 217,201
2 Claims. (Cl. 178—5.8)

The present invention relates to a method and apparatus for broadcasting a plurality of signals or programs on a single carrier or channel, which signals are selectably received at the listener's option. While the invention is applicable to arrangements provided with multiple audio tracks accompanying a TV broadcast, it also contemplates multiple audio FM broadcast and communications systems in general.

With the advent of communication satellites, international entertainment broadcasts are becoming a reality. Thus the problem of communicating in various languages is presented and the subject invention enables the avoidance of language translation with all of its attendant problems by permitting a simultaneous broadcast of, e.g., a single TV program with up to four or more different language sound tracks. Such a program may originate in the U.S., for example, and be rebroadcast directly over Europe from a space satellite to cover several countries simultaneously. Alternatively, the satellite could rebroadcast the program to local stations with each station selecting the audio signal appropriate to its listening audience for rebroadcast of the picture in the appropriate language.

In many places in the world, there are multilingual areas or cities such as New York or border regions neighboring foreign lands, in which this invention will permit disbursing of programming and commercial messages to a variety of language groups by a single station, simultaneously. It also enables stereophonic broadcast provided that the listener employs two receivers or slight modification of the receiver to be described. A feature of the invention is its ready applicability to existing broadcast systems and then with attendant facility savings, for it is possible to quadruple the audio handling capacity of present-day stations, e.g., in connection with the audio capacity of TV channels.

The invention will now be explained in connection with a preferred embodiment of a specific example providing multilingual TV. A TV broadcasting system is provided which is capable of transmitting simultaneously a number of audio signals on one common audio carrier alloted to any given TV channel. The system makes possible the broadcast of a TV program in a number of different languages simultaneously. The viewer simply operates a selector switch to show a program spoken in any one of a number of languages. Also, local stations may rebroadcast a TV program with one of a plurality of langauges selected from the original signal for recombination with the video signal for local broadcast.

Present-day facilities are readily modifiable to incorporate this system. In the transmitter relatively simple new circuits are added and in a modern-day receiver a slight adjustment of the IF amplifier and a simple circuit inserted between the discriminator and the audio amplifier will suffice. These modifications can be incorporated into existing facilities or manufactured into new sets.

In current TV systems, the sound carrier is frequency-modulated by the audio signal. The sound channel has a band width of 500 kc., of which only half is presently used. However, in the system of this invention, use is made of the available, but now unused, space in the frequency spectrum of the sound channel. Four audio signals, representing four different languages, amplitude modulate four subcarriers. These four modulated subcarriers constitute the signal which is used to frequency modulate the standard TV sound carrier allotted to the given TV channel. The combined signal is then broadcast in the conventional manner.

In the receiver the sound signal is separated from the video signal in the usual way. In the sound section of the receiver, the IF amplifier and the discriminator are adjusted to have a band width of 500 kc. Between the output of the discriminator and the input to the audio amplifier, four bandpass filters are inserted, each being designed to pass one of the modulated subcarriers. The output of the selected bandpass filter is applied to an added demodulator or detector which is used to suppress the subcarrier and to select the recovered audio signal. A ganged four-position switch between the bandpass filters and the detector and the filters and discriminator permits this selection. The selected audio signal is then applied to the audio amplifier, the output of which extends to a loudspeaker, or may be used to frequency modulate the transmitter of the station in the case of local rebroadcast.

With the foregoing in mind, it is an object of this invention to provide a multiple signal broadcasting system;

It is a further object to provide such a system readily adaptable to current transmitters and receivers;

More specifically, it is an object to provide a multilingual broadcast system and apparatus wherein all languages are carried on a common carrier;

A still further object is the provision of a system and apparatus for amplitude modulating a plurality of subcarriers which in turn frequency modulate a single carrier for broadcast;

It is yet another object to provide a method and suitable apparatus for receiving such a modulated carrier and selectably detecting the desired audio signal;

A still further object is the provision of such a system wherein the broadcast may be received in the home to permit selection by the listener of a particular audio signal or the broadcast may be received and rebroadcast by a station using a selected audio signal.

Other and further advantages, objects and features of the invention will become apparent to those skilled in the art from a reading of the following detailed description of a preferred embodiment of the invention when taken in the light of the accompanying drawing in which.

Figures 1, 2:
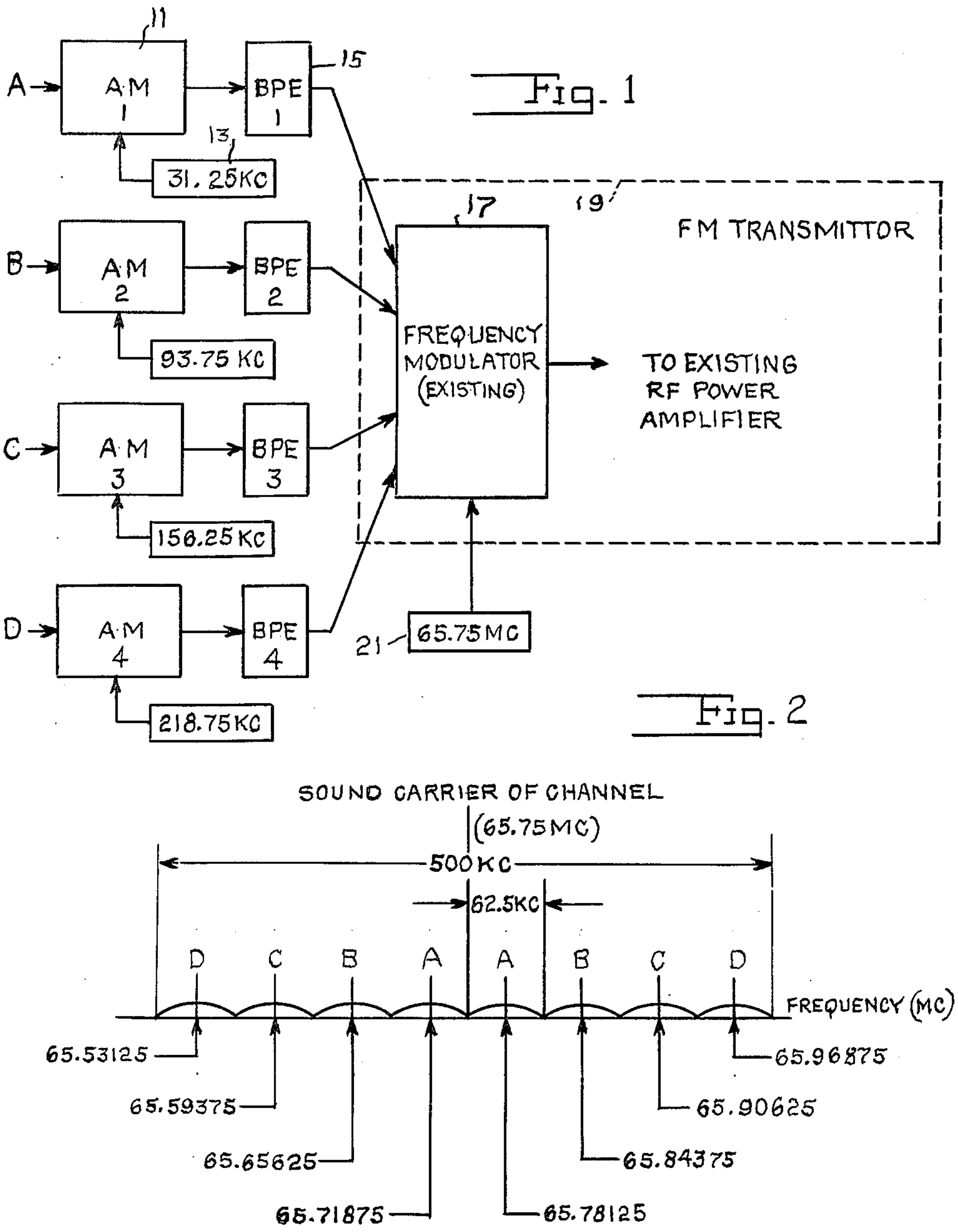
FIG. 1 is a block diagram of apparatus for modifying a present-day FM transmitter to accommodate multiple audio signals.
FIG. 2 shows a frequency spectrum for the sound carrier of a TV channel.

Referring now to the drawing, it will be seen in FIG. 1 that the audio channels representing four different langauge audio signals are designated by the letters A, B, C and D. Channel A is applied to an amplitude modulator 11 of conventional design, which is also supplied with a carrier frequency of 31.25 kc. from a local carrier source 13. The other channels are exact duplicates except that the carrier frequency for channel B is 93.75 kc., the carrier frequency for channel C is 156.25 kc., and the carrier frequency for channel D is 218.75 kc. Bandpass filters (the use of which is optional) are shown to receive the outputs of the amplitude modulators, the bandpass filter 15 for channel A being identified. The center frequency of this bandpass filter corresponds to the subcarrier frequency from source 13, namely 31.25 kc., and has a band width of plus and minus 15 kc.

The outputs of each of the bandpass filters are applied to the frequency modulator of a conventional FM transmitter 19. The carrier frequency for the broadcast station 19 is derived from source 21 and is illustrated as being 65.75 megacycles, a regular TV channel frequency.

The output of the frequency modulated signal, available from frequency modulator 17, exhibits the frequency spectrum shown in FIG. 2. As usual, the frequency deviation is 25,000 c.p.s. Each of the four channels on the 65.75 meg. frequency-modulated carrier has a band width of 125 kc., 62.5 kc. on each side of its individual subcarriers A, B, C and D, as is illustrated in FIG. 2. Thus it may be seen that the entire 500 kc. band presently allotted to the sound channel for each TV channel is completely used. In FIG. 2 this is verified by the transmitter frequency spectrum taken at the output of the FM modulator 17. The frequency spectrum at the transmitter, at the input of the frequency modulator, is shown in FIG. 4*b* representing the spacing of channels or audio tracks A, B, C and D.

Figure 3:
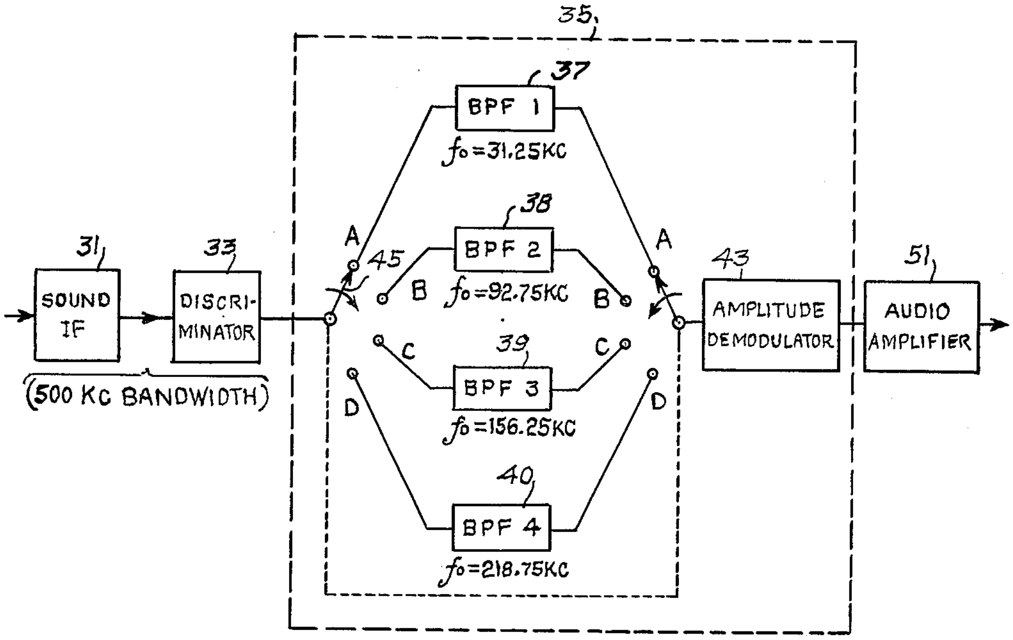
FIG. 3 is a block diagram of a portion of a receiving set showing a suitable modification to accommodate the present invention for audio selection.

In FIG. 3 a portion of a typical TV receiver has its sound section shown in block diagram. The sound IF amplifier stage is shown at 31 feeding the conventional discriminator 33. Each of these units is adjusted to have a band width of 500 kc. to accommodate the spread of the four audio channels to be handled. The band width of conventional IF amplifiers and discriminators is readily increasable from 200 kc. to 500 kc. at the expense of some sacrifice in gain. Of course, the manufacture of future sets will incorporate broader band width design, better to accommodate the system of the present invention.

Figure 4:
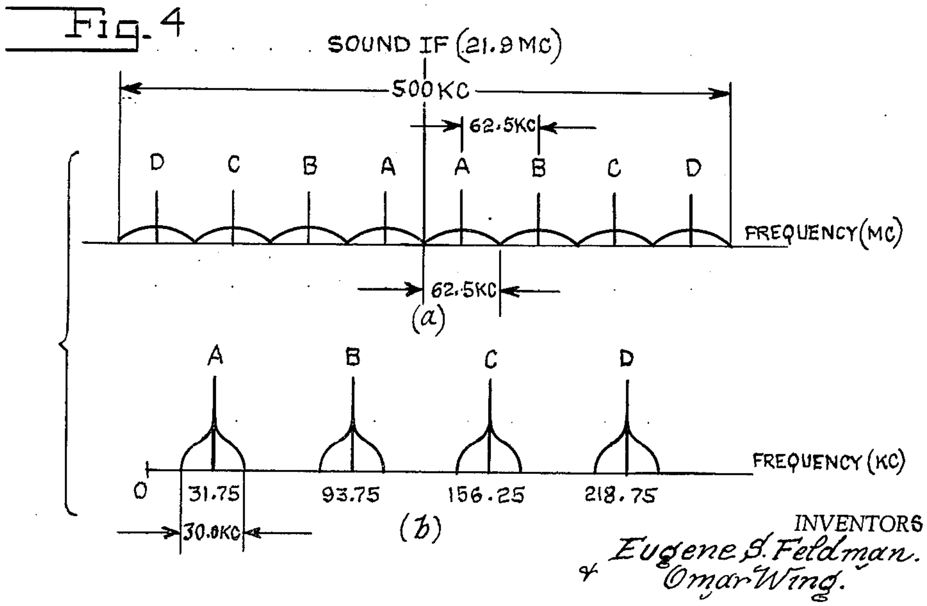
FIG. 4 shows a typical frequency spectrum in the receiver, FIG. *4a* showing the distribution at the input of the IF amplifier and FIG. *4b* showing the distribution at the output of the discriminator.

In FIG. 4 the frequency spectra at the receiver is shown relative to the IF and discriminator stages. FIG. 4*a* shows input distribution to the IF amplifier 31 and FIG. 4*b* shows the output of the discriminator 33. It may be appreciated that the IF carrier is now 21.9 meg. (FIG. 4*a*) and the spectrum of FIG. 4*b* shows the output of the discriminator as being the four subcarriers A, B, C and D, developed at the transmitter.

The conventional receiving set is modified by the addition of the new circuitry shown in the dotted box 35 of FIG. 3. This consists of four bandpass filters 37, 38, 39 and 40, adapted to be inserted between discriminator 33 and an added amplitude demodulator 43. The bandpass filters are provided to select the subcarriers A, B, C and D, and, of course, have a band width sufficiently wide to accommodate the audio modulation carried thereby.

A selector switch has a pair of ganged arms 45 and 47 to permit a listener to connect the discriminator output through any single one of the bandpass filters to the amplitude demodulator 43. The drawing is shown with the selection having been made on channel A whereby the subcarrier at the 31.25 kc. frequency is permitted to pass to the amplitude demodulator 43 for detection purposes. The detected audio of channel A is then fed to the regular audio amplifier stage 51 of the receiving set for application to the conventional loudspeaker if this is a home listener's receiving set, or to the frequency modulator section of a local broadcasting station if this channel is to be rebroadcast in the language selected.

From the example presented to explain the present invention, it will be appreciated that the system is quite flexible, permitting modification of conventional equipment or manufacture of future equipment. In connection with international broadcasting, it is usually more feasible to modify a local station since, in many instances, rebroadcasting is necessary because of conversion of the video signal from one system of frame speed and vertical resolution into another. However, it is quite conceivable that international standards will be established someday to permit direct transmission on a world-wide scale.

It will be understood that it is intended that the invention not be limited to the embodiment herein described, since many modifications and applications may be made without departing from the spirit and teachings herein disclosed; therefore, the invention should be construed in accordance with the scope of the appended claims in which:

What is claimed is:

1. Means for modifying a conventional TV receiver having a discriminator and audio amplifier to permit selection of any one of a plurality of different lingual audio signals respectively amplitude modulated on subcarriers spaced apart in frequency within the allotted sound bandwidth with the subcarriers being frequency modulated on a single channel carrier to be simultaneously broadcast comprising in combination a plurality of frequency selective paths including respectively bandpass filters responsive to the subcarriers of the audio signals; an amplitude detector; and switching means for selectively connecting any one of said paths between the discriminator and the detector to permit detection of the audio signal from the selected subcarrier for application to the audio amplifier to provide language for use with the TV picture.

2. The apparatus of claim 1 wherein the allotted sound bandwidth is 500 kc. and the subcarriers are substantially uniformly spaced apart in frequency within said bandwidth.

References Cited by the Examiner

UNITED STATES PATENTS

| | | | |
|---|---|---|---|
| 2,233,183 | 2/1941 | Roder | 179—15 |
| 2,514,425 | 7/1950 | Thompson | 343—200 |
| 2,709,254 | 5/1955 | Halstead | 343—200 |
| 2,776,429 | 1/1957 | Olerud | 179—15 |

DAVID G. REDINBAUGH, *Primary Examiner.*